(12) United States Patent
Chou

(10) Patent No.: US 8,226,306 B2
(45) Date of Patent: Jul. 24, 2012

(54) IMAGE CAPTURING DEVICE HAVING DETACHABLE POLARIZER

(75) Inventor: Yuan-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/862,773

(22) Filed: Aug. 25, 2010

(65) Prior Publication Data

US 2011/0223969 A1    Sep. 15, 2011

(30) Foreign Application Priority Data

Mar. 12, 2010    (TW) .............................. 99107389 A

(51) Int. Cl.
*G03B 17/00*    (2006.01)

(52) U.S. Cl. ......... 396/448; 396/529; 396/535; 348/373

(58) Field of Classification Search .................. 396/448, 396/529, 535, 544; 348/373; 455/556.1
See application file for complete search history.

(56) References Cited

U.S. PATENT DOCUMENTS

| | | | | |
|---|---|---|---|---|
| 5,768,649 A * | 6/1998 | Pearson | ......................... | 396/529 |
| 7,292,281 B2 * | 11/2007 | Cheng | ......................... | 348/373 |
| 7,600,930 B2 * | 10/2009 | Wang et al. | .................. | 396/448 |
| 7,616,392 B2 * | 11/2009 | Igarashi et al. | ............... | 359/818 |
| 2010/0254698 A1 * | 10/2010 | Louis | ........................... | 396/448 |

\* cited by examiner

*Primary Examiner* — Christopher Mahoney
(74) *Attorney, Agent, or Firm* — Altis Law Group, Inc.

(57) ABSTRACT

An image capturing device includes a housing, a camera module, polarizer, and a cover. The housing defines a through hole. The camera module is received in the housing and aligned with the through hole. The cover defines an opening. The polarizer is connected to the cover. The cover is detachably engaged with the housing. The camera module, the through hole, the polarizer, the opening aligned with each other.

18 Claims, 4 Drawing Sheets

IMAGE CAPTURING DEVICE HAVING DETACHABLE POLARIZER

BACKGROUND

1. Technical Field

The present disclosure relates to imaging technology and, particularly, to an image capturing device having a detachable polarizer.

2. Description of Related Art

Polarizers are often used with an image capturing device to filter out light which isn't polarized parallel to an axis of the polarizer. As a result, the polarizer can eliminate glare from some objects like water and glass and block certain types of light waves to render the sky deeper and darker, as well as improving saturation of images by eliminating unwanted reflections from some objects. However, many devices, such as mobile phones, include a built-in polarizer and so a user does not have the option to capture images without using the polarizer.

Therefore, it is desirable to provide an image capturing device and a mobile phone, which can overcome or at least alleviate the above-mentioned problems.

DETAILED DESCRIPTION

Figure 1:
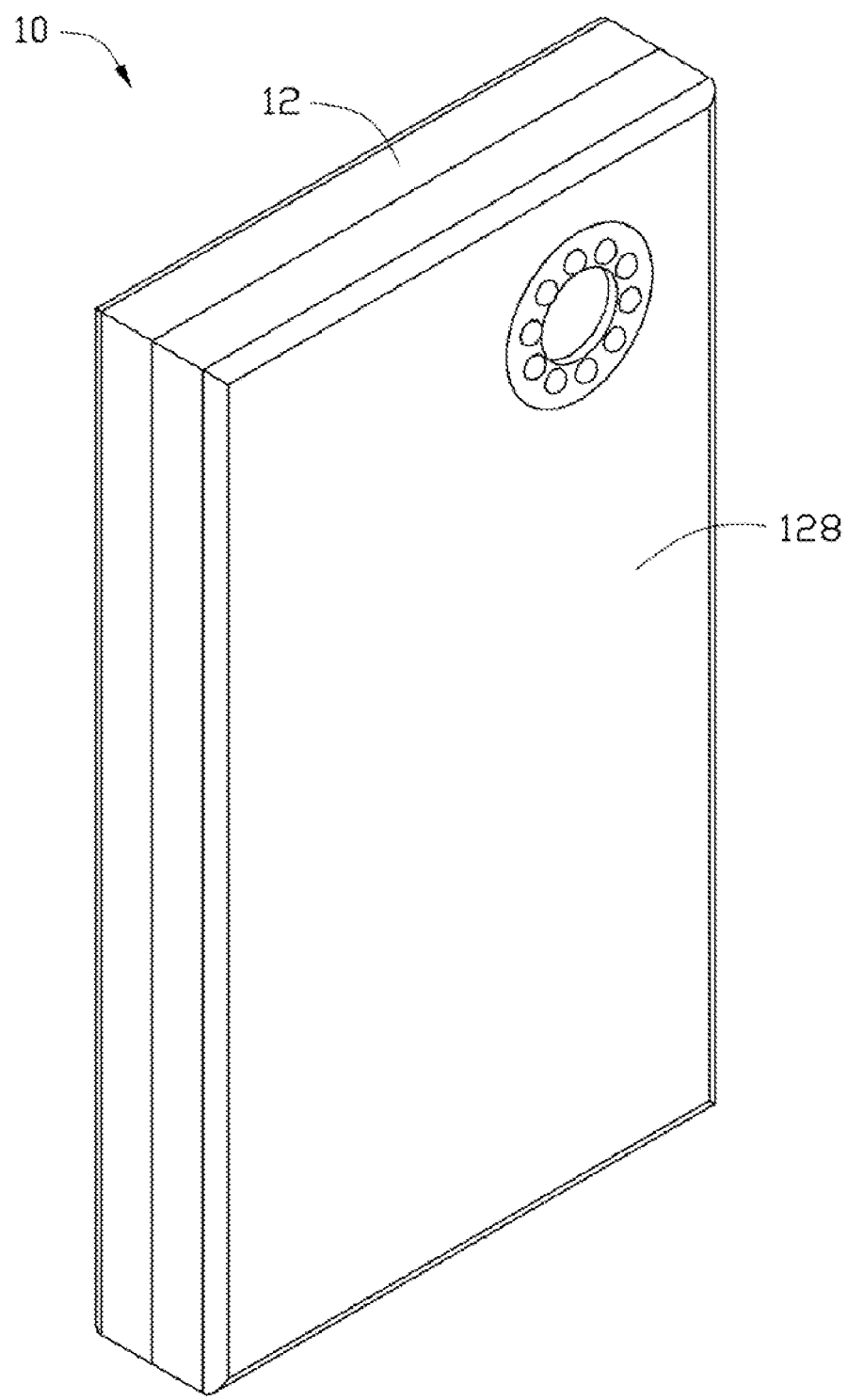
FIG. 1 is a schematic, isometric view of an image capturing device including a cover, according to a first exemplary embodiment.
Figure 2:
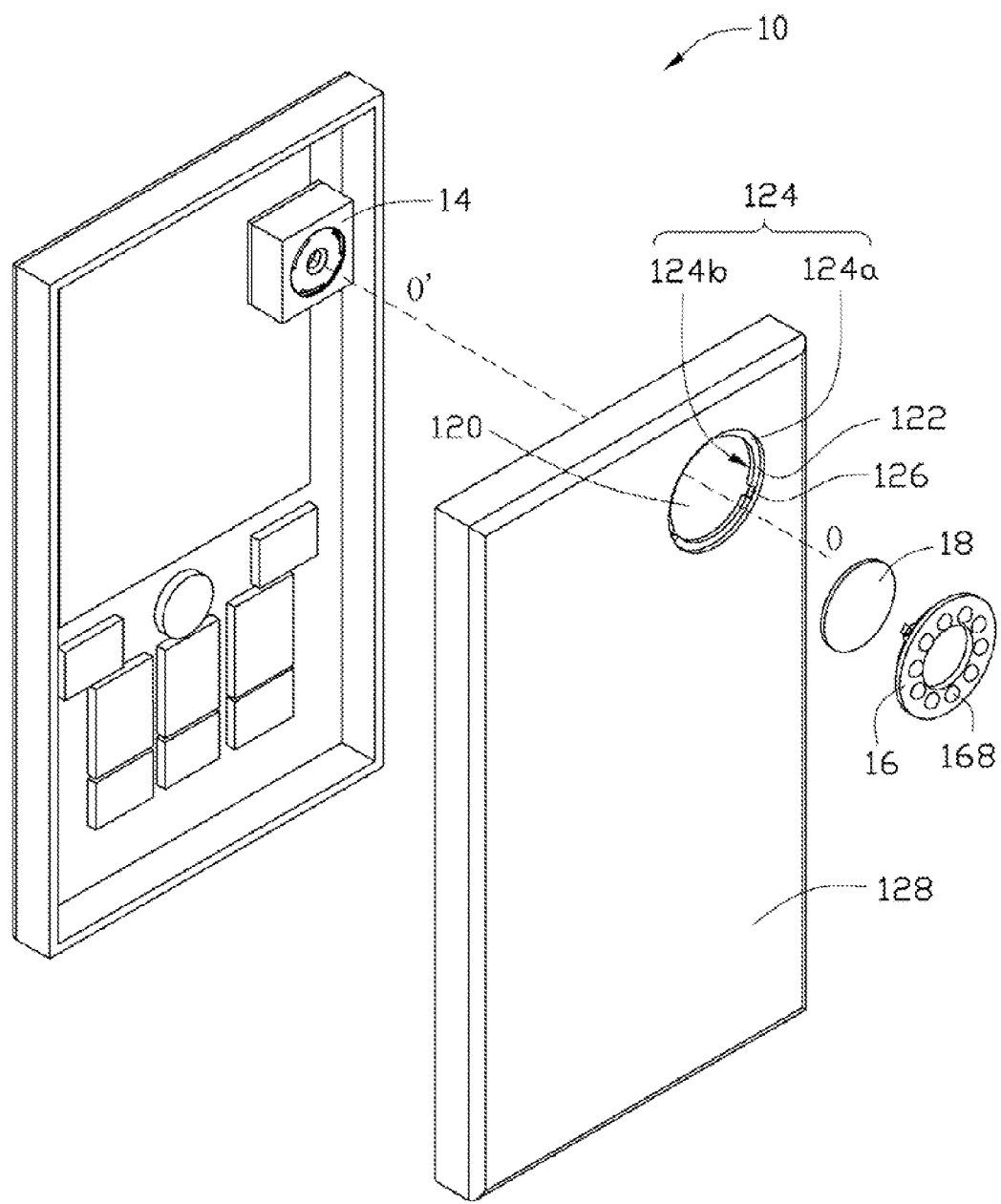
FIG. 2 is an exploded view of the image capturing device of FIG. 1.
Figure 3:
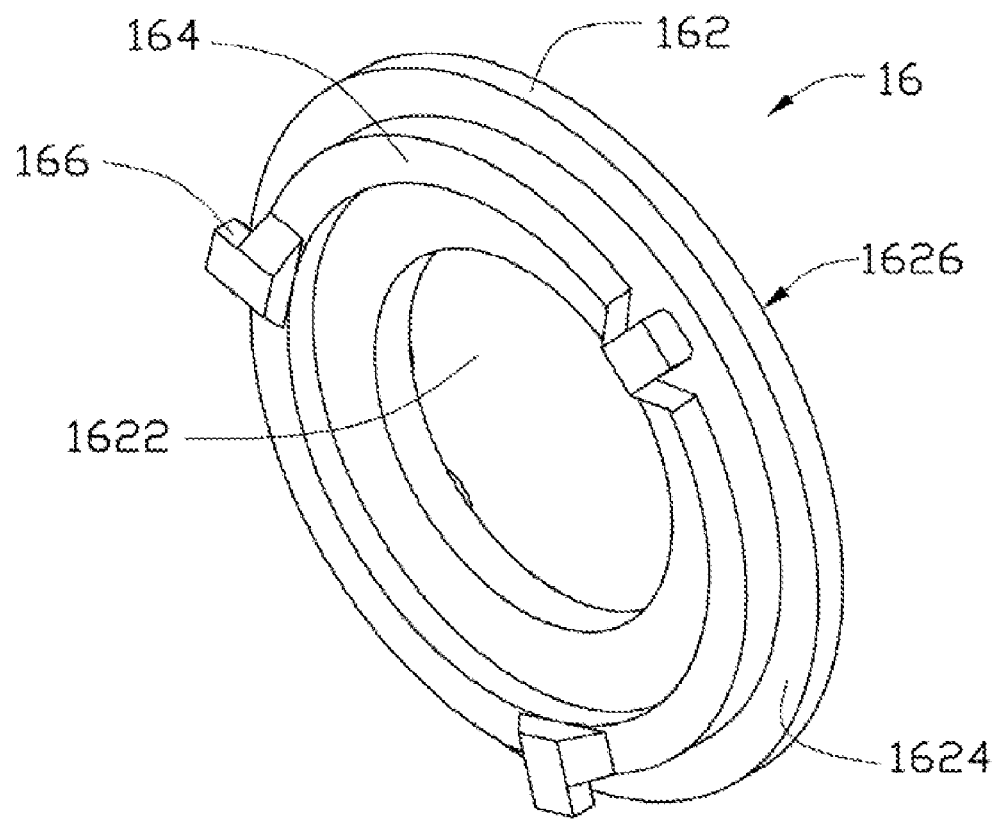
FIG. 3 is a schematic, isometric view of the cover of FIG. 1.

Referring to FIGS. 1-3, an image capturing device 10, according to a first exemplary embodiment, includes a housing 12, a camera module 14, a cover 16, and a polarizer 18. The image capturing device 10 may be a mobile phone or a person digital assistant (PDA). In this embodiment, the image capturing device 10 is a mobile phone.

The housing 12 defines a through hole 120 having an axis OO' and includes an outer surface 128. A ring-shaped supporting portion 124 is formed on a sidewall 122 of the housing 12 in the through hole 120. Three cutouts 126 are defined in the supporting portion 124 and spaced apart from each other. The supporting portion 124 includes a supporting surface 124a and a blocking surface 124b. The supporting surface 124a and the blocking portion 124b are at opposite sides of the supporting portion 124. The supporting surface 124a is adjacent to the outer surface 128.

The camera module 14 is received in the housing 12 and aligned with the through hole 120. An optical axis of the camera module 14 is coaxial with the axis OO'. The camera module 14 is configured for receiving light reflected by objects and processing the light to be an image.

The cover 16 includes a ring-shaped body portion 162, a ring-shaped engaging portion 164, three arms 166 corresponding to the three cutouts 126, and ten protrusions 168. The body portion 162 defines an opening 1622. The body portion 162 includes a first surface 1624 and a second surface 1626. The first surface 1624 and the second surface 1626 are at opposite sides of the body portion 162. The first surface 1624 is supported by the supporting surface 124a. The engaging portion 164 protrudes from the first surface 1624. The inner diameter of the engaging portion 164 is greater than the diameter of the opening 1622. The three arms 166 extend from the engaging portion 164. The protrusions 168 are arranged on the second surface 1626 and are equidistant from each other around the axis OO'. In this embodiment, the protrusions 168 are hemispheroids. The thickness of the body portion 162 is substantially equal to the distance from the outer surface 128 to the supporting surface 124a. That is, the second surface 1626 of the body portion 162 is substantially flush with the outer surface 128 of the housing 12. The body portion 162, the engaging portion 164, and the arms 166 are formed into a unitary piece in this embodiment.

In other embodiments, the second surface 1626 of the body portion 162 is raised relative to the outer surface 128 of the housing 12, or the second surface 1626 of the body portion 162 is recessed relative to the outer surface 128 of the housing 12.

The polarizer 18 engages in the engaging portion 164 and contacts with the first surface 1624. The camera module 14, the through hole 120, the polarizer 18, and the opening 1622 are aligned with each other. The polarizer 18 may be a standard polarizer or some other photographic filter.

When the polarizer 18 is attached to the housing 12, the polarizer 18 engages in the engaging portion 164 and contacts with the first surface 1624 so that the polarizer 18 is connected to the cover 16. The three arms 166 pass through the tree cutouts 126 and the first surface 1624 is supported by the supporting surface 124a. The body portion 162 is rotated by pressing the protrusions 168 to make the arms 166 contact the blocking surface 124b. Therefore, the cover 16 is assembled in the housing 12.

To detach the polarizer 18 from the housing 12, the body portion 162 is rotated by pressing the protrusions 168 to make the arms 166 correspond to the cutouts 126. Then, the cover 16 can drop off from the housing 12, and then the polarizer 18 can be manually detached from the cover 16. As a result, the polarizer 18 is an easily usable option. Furthermore, the protrusions 168 make it easier to grasp and rotate the body portion 162.

Figure 4:
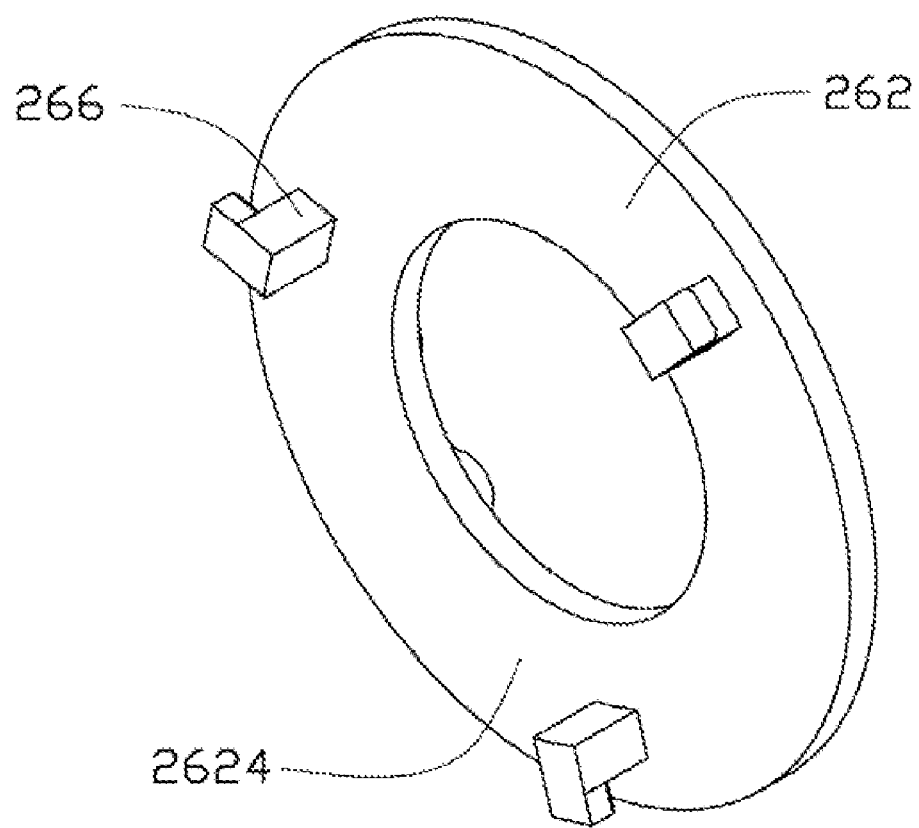
FIG. 4 is a schematic, isometric view of a cover, according to a second exemplary embodiment.

Referring to FIG. 4, an image capturing device, according to a second exemplary embodiment, is shown. The difference between the image capturing device of this embodiment and the image capturing device 10 of the first embodiment is: an engaging portion is omitted and three arms 266 extend from the body portion 262 to engage the polarizer (not shown) in cooperation with the first surface 2624.

The advantages of the image capturing device of the second exemplary embodiment are similar to those of the image capturing device 10 of the first exemplary embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An image capturing device, comprising:
    a housing defining a through hole, a ring-shaped supporting portion formed on a sidewall of the housing in the through hole, a plurality of cutouts defined in the supporting portion and spaced apart from each other, and the supporting portion comprising a supporting surface and a blocking surface;

a camera module received in the housing and aligned with the through hole, the blocking surface facing toward the camera module, and the supporting surface facing away from the camera module;

a polarizer; and a cover defining an opening and comprising a body portion and a plurality of arms, the body portion comprising a first surface and a second surface facing away from the first surface, the arms extending from the first surface, the arms surrounding and engaging with the polarizer in cooperation with the first surface, the arms passable through the cutouts for coming into contact with the blocking surface, the supporting surface contacting the first surface, and the camera module, the through hole, the polarizer, and the opening aligned with each other.

2. The image capturing device as claimed in claim 1, wherein the cover further comprises a plurality of protrusions extending from the second surface.

3. The image capturing device as claimed in claim 2, wherein the protrusions are hemispheroids.

4. The image capturing device as claimed in claim 3, wherein the second surface of the body portion is substantially flush with an outer surface of the housing.

5. The image capturing device as claimed in claim 3, wherein the second surface of the body portion is raised relative to an outer surface of the housing.

6. The image capturing device as claimed in claim 3, wherein the second surface of the body portion is recessed relative to an outer surface of the housing.

7. The image capturing device as claimed in claim 1, wherein the body portion and the arms are formed into a unitary piece.

8. An image capturing device, comprising:

a housing defining a through hole, a ring-shaped supporting portion formed on a sidewall of the housing in the through hole, a plurality of cutouts defined in the supporting portion and spaced apart from each other, the supporting portion comprising a supporting surface and a blocking surface;

a camera module received in the housing and aligned with the through hole, the blocking surface facing toward the camera module, and the supporting surface facing away from the camera module;

a polarizer; and a cover defining an opening and comprising a body portion, a ring-shaped engaging portion, and a plurality of arms, the body portion comprising a first surface and a second surface facing away from the first surface, the engaging portion protruding from the first surface, the arms extending from the engaging portion, the engaging portion and the first surface engaging with the polarizer, the arms passable through the cutouts for coming into contact with the blocking surface, the supporting surface contacting the engaging portion, and the camera module, the through hole, the polarizer, and the opening aligned with each other.

9. The image capturing device as claimed in claim 8, wherein the cover further comprises a plurality of protrusions extending from the second surface.

10. The image capturing device as claimed in claim 9, wherein the protrusions are hemispheroids.

11. The image capturing device as claimed in claim 10, wherein the second surface of the body portion is substantially flush with an outer surface of the housing.

12. The image capturing device as claimed in claim 10, wherein the second surface of the body portion is raised relative to an outer surface of the housing.

13. The image capturing device as claimed in claim 10, wherein the second surface of the body portion is recessed relative to an outer surface of the housing.

14. The image capturing device as claimed in claim 8, wherein the body portion, the arms, and the engaging portion are formed into a unitary piece.

15. An image capturing device, comprising:

a housing defining a through hole;

a camera module received in the housing and aligned with the through hole;

a polarizer; and a cover defining an opening and comprising a body portion, a ring-shaped engaging portion, a plurality of arms, and a plurality of protrusions, the body portion comprising a first surface and a second surface facing away from the first surface, the engaging portion protruding from the first surface, the arms extending from the engaging portion, the protrusions extending from the second surface and being hemispherical, the polarizer connected to the cover, the cover detachably engaged with the housing, and the camera module, the through hole, the polarizer, and the opening aligned with each other.

16. The image capturing device as claimed in claim 15, wherein the second surface of the body portion is substantially flush with an outer surface of the housing.

17. The image capturing device as claimed in claim 15, wherein the second surface of the body portion is raised relative to an outer surface of the housing.

18. The image capturing device as claimed in claim 15, wherein the second surface of the body portion is recessed relative to an outer surface of the housing.

* * * * *